United States Patent
Ekambaram et al.

(10) Patent No.: US 10,635,809 B2
(45) Date of Patent: *Apr. 28, 2020

(54) AUTHENTICATING APPLICATION LEGITIMACY

(71) Applicant: INTERNATIONAL BUSINESS MACHINES CORPORATION, Armonk, NY (US)

(72) Inventors: Vijay Ekambaram, Tamilnadu (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,794

(22) Filed: Jan. 25, 2019

(65) Prior Publication Data
US 2019/0171812 A1 Jun. 6, 2019

Related U.S. Application Data

(63) Continuation of application No. 15/933,888, filed on Mar. 23, 2018, now Pat. No. 10,216,930, which is a
(Continued)

(51) Int. Cl.
*G06F 7/04* (2006.01)
*G06F 21/55* (2013.01)
(Continued)

(52) U.S. Cl.
CPC .............. *G06F 21/55* (2013.01); *G06F 21/44* (2013.01); *G06F 21/64* (2013.01);
(Continued)

(58) Field of Classification Search
CPC .......... G06F 21/55; G06F 21/64; G06F 21/31; G06F 21/44; H04L 63/0853; H04L 63/1483; H04W 12/00522
(Continued)

(56) References Cited

U.S. PATENT DOCUMENTS

| 7,634,810 B2 | 12/2009 | Goodman et al. |
| 8,943,320 B2 | 1/2015 | Sabin et al. |

(Continued)

FOREIGN PATENT DOCUMENTS

| WO | 2010105184 A3 | 9/2010 |
| WO | 2010110885 A3 | 9/2010 |

OTHER PUBLICATIONS

List of IBM Patents or Applications Treated as Related, Feb. 4, 2019, 2 pgs.
(Continued)

*Primary Examiner* — Samson B Lemma
(74) *Attorney, Agent, or Firm* — Michael O'Keefe; Matthew M. Hulihan; Heslin Rothenberg Farley & Mesiti PC

(57) ABSTRACT

Facilities are provided herein to address application phishing by determining whether an application is a legitimate application it purports to be. Optical code(s) are displayed on a display device in association with an application to be authenticated for a user as being a legitimate application. Based on imaging the optical code(s) using a camera of a device of a user, data of the optical code(s) are obtained. It is automatically determines, based on the obtained data of the optical code(s), whether the application to be authenticated is authenticated as being the legitimate application, and based on this, an indication of whether the application is authenticated as being the legitimate application is provided for the user by the device.

20 Claims, 9 Drawing Sheets

Related U.S. Application Data continuation of application No. 14/819,627, filed on Aug. 6, 2015, now Pat. No. 9,946,874.

(51) Int. Cl.
*G06F 21/64* (2013.01)
*H04L 29/06* (2006.01)
*G06F 21/44* (2013.01)
G06F 21/31 (2013.01)
H04W 12/00 (2009.01)

(52) U.S. Cl.
CPC ...... *H04L 63/0853* (2013.01); *H04L 63/1483* (2013.01); *G06F 21/31* (2013.01); *H04W 12/00522* (2019.01)

(58) Field of Classification Search
USPC ............................................................ 726/7
See application file for complete search history.

(56) References Cited

U.S. PATENT DOCUMENTS

| | | | | |
|---|---|---|---|---|
| 9,262,631 | B2* | 2/2016 | Wang | G06F 21/554 |
| 9,344,450 | B2* | 5/2016 | Di Cocco | G06F 21/36 |
| 9,665,718 | B2* | 5/2017 | Anderson | G06F 21/57 |
| 9,946,874 | B2 | 4/2018 | Ekambaram et al. | |
| 2008/0034428 | A1 | 2/2008 | Bejar et al. | |
| 2011/0219427 | A1 | 9/2011 | Hito et al. | |
| 2013/0036468 | A1 | 2/2013 | Georgiev | |
| 2013/0185210 | A1* | 7/2013 | Dodson | H04L 63/08 705/44 |
| 2014/0007195 | A1* | 1/2014 | Gupta | G06F 21/34 726/4 |
| 2014/0007205 | A1* | 1/2014 | Oikonomou | G06F 21/35 726/6 |
| 2014/0230050 | A1 | 8/2014 | Higbee et al. | |
| 2014/0337634 | A1 | 11/2014 | Starner et al. | |
| 2015/0288682 | A1* | 10/2015 | Bisroev | G06F 3/0481 713/172 |
| 2016/0027017 | A1* | 1/2016 | Chitragar | G06Q 20/4018 705/71 |
| 2016/0112437 | A1* | 4/2016 | Churyumov | G06F 21/43 726/7 |
| 2017/0041309 | A1 | 2/2017 | Ekambaram et al. | |
| 2018/0218151 | A1 | 8/2018 | Ekambaram et al. | |

OTHER PUBLICATIONS

Choi, K., et al., "A Mobile Based Anti-Phishing Authentication Scheme Using QR Code", Sungkyunkwan University, Suwon, Republic of Korea, pp. 109-113.

Maesre, D., "QRP: An Improved Secure Authentication Method Using QR Codes", Universitat Oberta de Catalunya, Jun. 8, 2012, pp. 1-11.

Potoczny-Jones, I., "Quick authentication using mobile devices and QR Codes", Feb. 18, 2014, 8 pgs.

* cited by examiner

AUTHENTICATING APPLICATION LEGITIMACY

BACKGROUND

Phishing refers to an attempt to obtain sensitive information from a user who is under a mistaken belief that he or she is providing the information to a different entity. A common phishing scenario involves a malicious entity imitating the appearance of a legitimate entity through emails or websites. The malicious entity then prompts users for sensitive information such as their usernames and passwords. Although attempts have been made to curb phishing practices, their effectiveness varies.

SUMMARY

Shortcomings of the prior art are overcome and additional advantages are provided through the provision of a method that includes obtaining, based on imaging at least one optical code using a camera of a device of a user, data of the at least one optical code, the at least one optical code being displayed on a display device in association with an application to be authenticated for the user as being a legitimate application; automatically determining, based on the obtained data of the at least one optical code, whether the application to be authenticated is authenticated as being the legitimate application; and providing for the user, by the device of the user, based on the automatically determining, an indication of whether the application to be authenticated is authenticated as being the legitimate application.

Further, a computer program product including a computer readable storage medium readable by a processor and storing instructions for execution by the processor is provided for performing a method that includes: obtaining, based on imaging at least one optical code using a camera of a device of a user, data of the at least one optical code, the at least one optical code being displayed on a display device in association with an application to be authenticated for the user as being a legitimate application; automatically determining, based on the obtained data of the at least one optical code, whether the application to be authenticated is authenticated as being the legitimate application; and providing for the user, by the device of the user, based on the automatically determining, an indication of whether the application to be authenticated is authenticated as being the legitimate application.

Yet further, a computer system is provided that includes a memory and a processor in communications with the memory, wherein the computer system is configured to perform a method including: obtaining, based on imaging at least one optical code using a camera of a device of a user, data of the at least one optical code, the at least one optical code being displayed on a display device in association with an application to be authenticated for the user as being a legitimate application; automatically determining, based on the obtained data of the at least one optical code, whether the application to be authenticated is authenticated as being the legitimate application; and providing for the user, by the device of the user, based on the automatically determining, an indication of whether the application to be authenticated is authenticated as being the legitimate application.

Additional features and advantages are realized through the concepts described herein.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
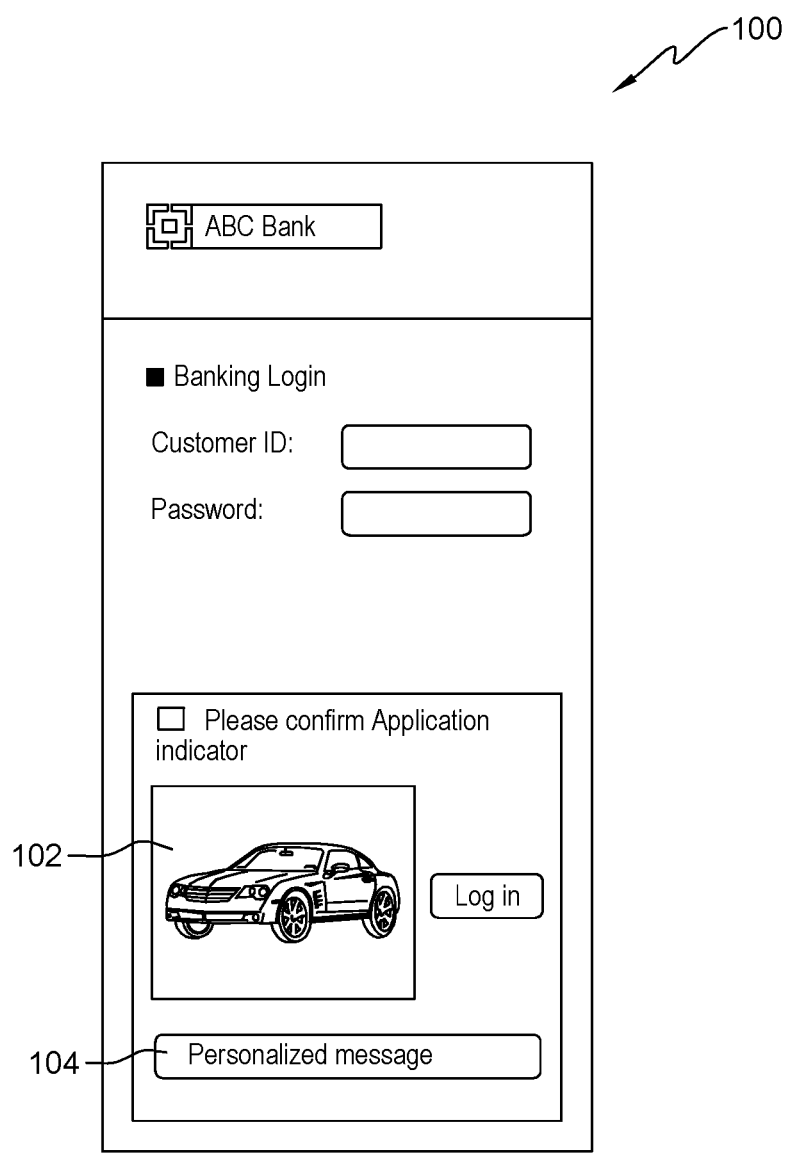
FIG. 1 depicts an example application interface incorporating user-specific application indicators.

Aspects described herein address application ("app") phishing, which refers to the practice of masquerading as one application—a legitimate application—by another application. More specifically, imaging capabilities such as those of wearable devices are leveraged for authenticating an application purporting to be another, legitimate application.

Recent developments in computer technology have made it increasingly convenient to incorporate small, internet-connected devices into our everyday lives. Example devices include battery-powered, generally handheld (or smaller) devices that are carried or worn by the user. This so-called "wearable technology" serves practical purposes by providing relevant information based on context, helping users stay organized, facilitating communication with others, and tracking user health markers, as examples. Specific examples of wearable technology include Google Glass™ (offered by Google Inc., Mountain View, Calif., USA) and smartwatches, such as those offered by Samsung Group (Suwon, South Korea) and LG Corporation (Seoul, South Korea).

According to aspects described herein, indications as to whether a mobile, web, or other type of application is the legitimate application it purports to be are provided to users via a wearable (or other) user device, referred to herein as a notifying device. This is used to prevent application phishing attacks by informing the user whether the displayed application is authentic. The user may expect an indication of legitimacy from the device and if none is provided, then the user can refrain from entering sensitive information and take remedial measures to address the compromise. This may be useful for assuring legitimacy of applications executing on any type of computer system, such as a smartphone, tablet, other types of mobile device, personal computer, laptop, etc., as well as browser-based web-applications.

Application phishing attempts to trick a user into believing that a malicious application with which he or she is working is a legitimate application. The malicious application often looks very similar or identical to the original legitimate application, making it difficult or impossible for the user to recognize based on looks alone that the application is not the legitimate application. In the mobile device context, malicious applications can find their way to user devices in any of several ways. A malicious application can try to uninstall or conceal a legitimate application it attempts to replace so that a user launching the application actually unknowingly launches the malicious application. Mobile application phishing is commonly used to steal usernames, passwords, or personal identification numbers that legitimate applications including banking or email applications commonly require for security reasons.

Application phishing is considered different from application tampering, which involves tampering with or modifying code of a legitimate application to cause the legitimate application to behave differently. Application phishing does not necessarily tamper with the legitimate application. Instead, the malicious application may be a completely separate program that prominently places itself in front of the user so the user believes it to be the legitimate application. Application phishing arises when a user unknowingly launches a look-alike application or website, for instance by clicked a wrong icon or URL, and it relies on end users not being able to differentiate the legitimate application from the launched malicious application.

Addressing the problem of application phishing focuses on authenticating an application as being legitimate. This is different from multi-factor authentication (MFA), such as two-factor authentication, which focuses on authenticating users through user involvement. MFA solutions (SMS based, barcode based, etc.) do not prevent application phishing. For example, assume a user is working in a malicious application instead of the legitimate app. The malicious application can imitate the MFA verification by prompting the user for a one-time password (OTP) (possibly after sending it to the user's mobile device as a SMS verification code which is a common MFA practice), and, regardless of the code the user types into the malicious app on the MFA screen, display a message that verification is successful. The user believes that the application is legitimate based on the fake MFA verification and provides the sensitive information to the malicious application.

Application phishing detection, on the other hand, is directed to application authentication—identifying that the application is not legitimate to begin with, and, in accordance with aspects described herein, may not require any user involvement to identifying application legitimacy. As described herein, phishing detection software (PDS) may be started at device boot and automatically begin checking legitimacy of a launched application. The device on which the PDS runs may refer to a device separate from the one on which the application runs. For instance, the user's smartphone may execute the application, while a separate device, such as a wearable device, executes the PDS software. For purposes of description herein, the device running the PDS and providing an indication as to legitimacy of an application is referred to as the notifying device, and the system on which the application is launched is referred to as the application device or system. In some embodiments, the notifying device and application device are the same device or system, or are components of the same device, though in examples described herein they are separate computer systems.

As described below, detection of an optical code such as one presented by a launched program can trigger a check by the PDS for application legitimacy. An example type of optical code used for description purposes throughout this application is a matrix barcode, which is a form of barcode, an example of which is commonly referred to as a "Quick Response" or "QR" code (QR Code is a registered trademark of Denso Wave Incorporated, a subsidiary of Denso Corporation, Kariya, Japan). The legitimate application can therefore be configured to present optical code(s) to facilitate application authentication, and this expected behavior of the legitimate application can be known to, and expected by, the users. A malicious application that does not display an appropriate optical code will not necessarily invoke this PDS checking, but the user can nevertheless understand and/or receive a notification that the application is malicious (as the legitimate application is to have a QR code next to login button, for instance).

In other examples, PDS may reside in the same device that launches and presents the application. In these aspects, pixels of the display buffer may be obtained or "ripped" in a process known as graphical user interface (GUI) ripping, to parse out the QR code(s) for further processing. When PDS of this type is utilized on a mobile device, the processing is likely to require root access or jail-break permissions for the device.

Barcode-based one-time password authentication to authenticate users may be incorporated into mobile applications. Aspects described herein, however, differ from traditional QR code authentication, since the considerations to address application phishing are different from those of barcode-based authentication used for authenticating users.

The PDS provides an easy user experience to check and provide an indication of application legitimacy when a user opens an application on a mobile device, in a web browser, or any other computer system. A real-time, practically instantaneous indication of application legitimacy or illegitimacy may be provided by the user's notifying device, for instance by the display or other output thereof. The indication can be non-intrusive and easily understandable, providing a hands-free experience with no additional steps required by the user.

There are three primary types of application phishing. The first is a forwarding attack whereby a user clicks an overlaid button that opens a malicious application screen instead of the legitimate application screen. In a background attack, a phishing application runs in the background and detects when a user attempts to open a legitimate application. This may be detected through application programming interface (API) calls, for instance. The malicious application may launch at that time and present itself to the user as the legitimate application. The third type of application phishing is a notification attack in which an attacker provides a fake notification window and asks the user to enter his or her credentials.

No matter the type of application phishing, approaches thus far are unable to reliably prevent application phishing. The most widely used approach involves application indicators, in which a user pre-enrolls a personalized image and/or message. Whenever the user logs into the application, the enrolled personalized image and/or message is presented. An example is shown in FIG. 1. Application interface 100 is presented on launch of the application or upon the user navigating to a website that requires a login. In the example of FIG. 1, the application is a banking application. The application indicators in FIG. 1 include an image 102 and message 104 that are presented. The image and message come from the application server (e.g. of the bank in this example), so a malicious application should not have access to the correct indicators for this particular user. Thus, the user is able to differentiate a legitimate application from a malicious application based on whether correct application indicator(s) are presented.

This approach has several pitfalls, the primary one of which involves snapshot-based phishing. Various known snapshot mechanisms, typically installed as local software running in the background of a system, can relatively easily steal the user's image and message when the user logs into the legitimate application. Screen scraping, for instance, may be used to isolate the image and message from the interface that the user uses to log into the legitimate application. The isolated image/message can then be incorporated into a spoofed login screen of a malicious application. Username-indicator pairs can be aggregated and stored in a database that is checked by a malicious application when phishing. So, in the same way a legitimate application obtains a user's application indicator(s) from a remote server when the user attempts a login to the legitimate application, a malicious application could also obtain these application indicator(s) dynamically from a backend database of stolen username-indicator pairs and present them to the user who unknowingly accepts that the application is the legitimate application.

Some approaches embed timestamp information or other form of dynamic watermark against the application indicator images to prevent snapshot techniques, however it is nonetheless the responsibility of the users to verify the image and the watermarked timestamp, which can be very difficult from the user perspective.

Accordingly, what is needed are facilities to assist end users with automated verification of application legitimacy to help prevent application phishing. According to aspects described herein, wearable or other devices are configured to automatically determine and indicate to a user whether a launched application purporting to be a legitimate application is authenticated as being the legitimate application, or instead is determined to be malicious. This is designed to be resilient even to snapshot-based phishing.

Figure 2:
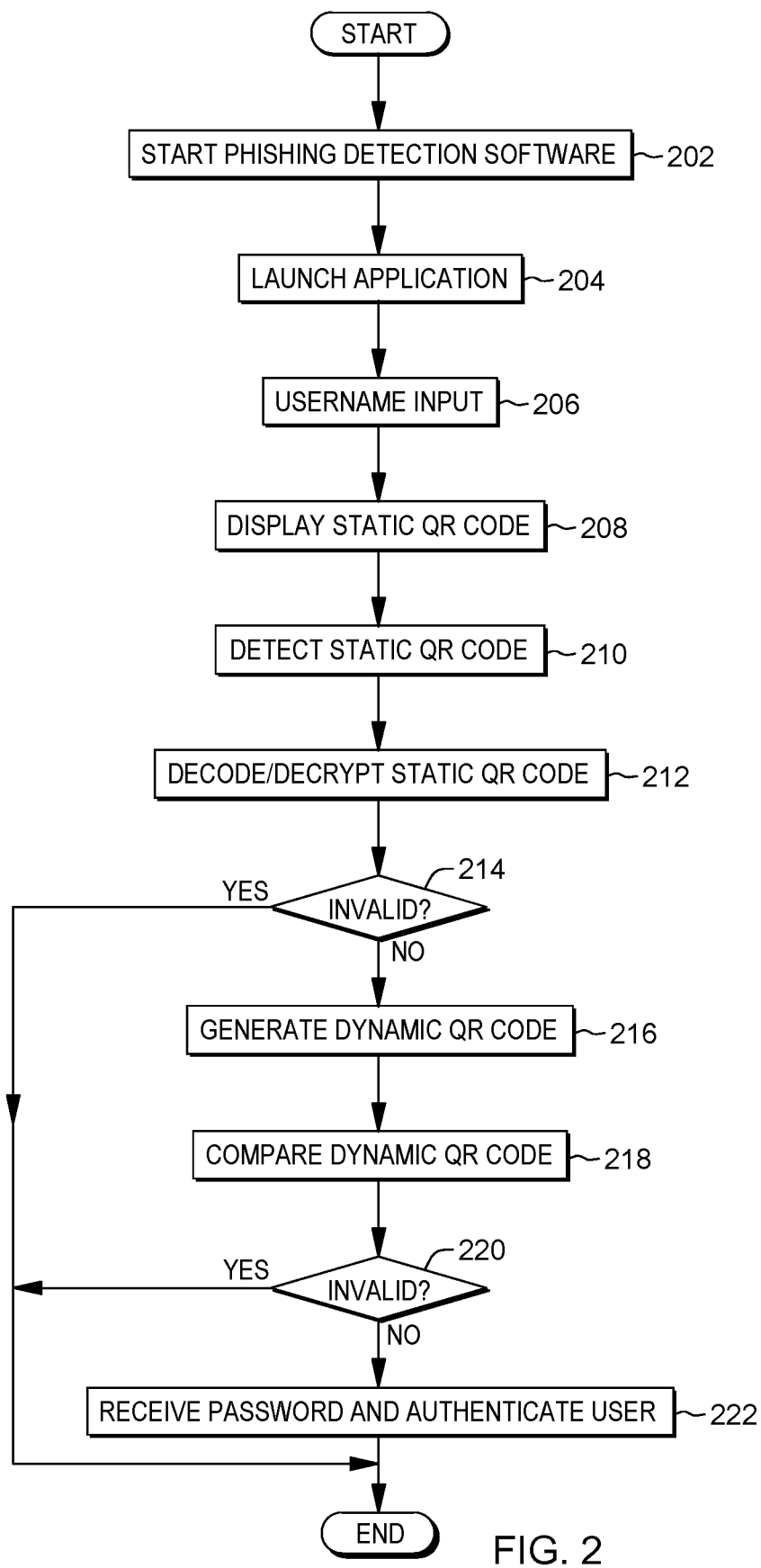
FIG. 2 depicts an example process to facilitate authentication of an application as being a legitimate application, in accordance with aspects described herein.
Figure 3:
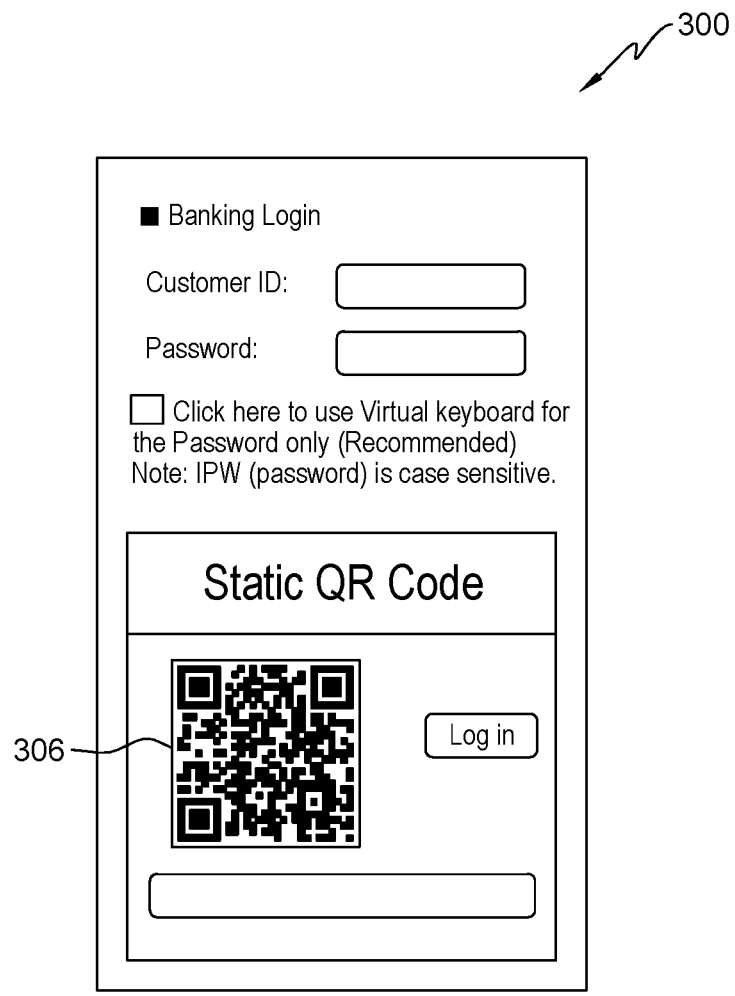
FIG. 3 depicts an example application interface incorporating a static QR code to facilitate authentication of an application as being a legitimate application, in accordance with aspects described herein.
Figure 4:
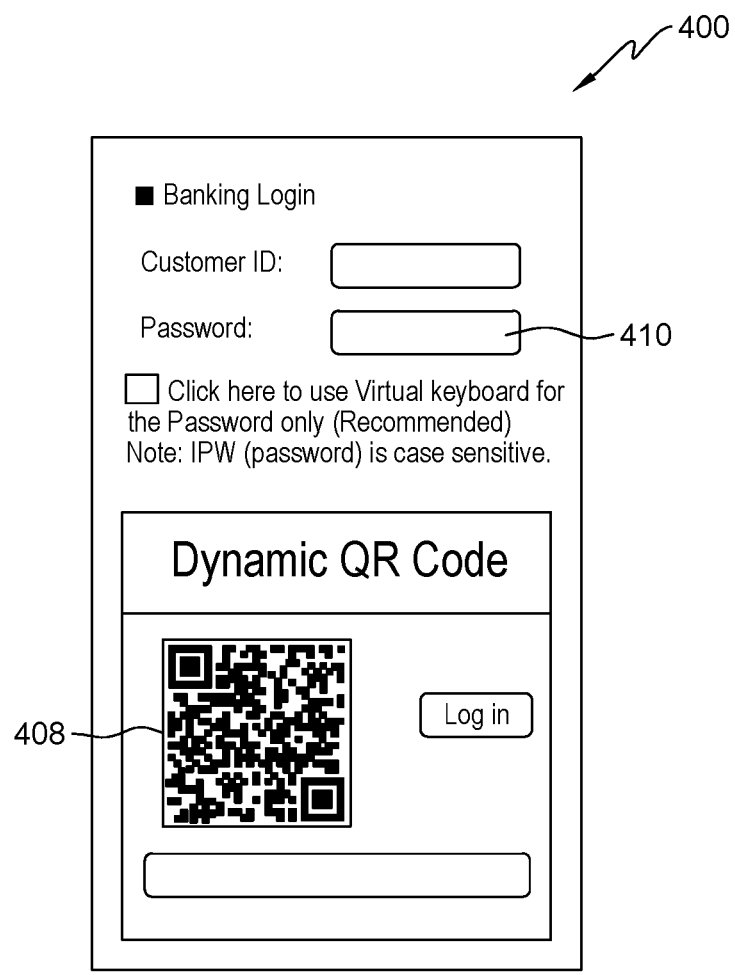
FIG. 4 depicts an example application interface incorporating a dynamic QR code to facilitate authentication of an application as being a legitimate application, in accordance with aspects described herein.

Examples used in verifying authenticity of an application are presented with reference to FIGS. 2-4. In these examples, the optical codes are matrix barcodes (QR codes), though an optical code can be any optically-recognizable item(s) that can encode data. FIG. 2 depicts an example overall process and begins with the launch of phishing detection software during boot of the user's device (202). This may be done after first checking and verifying a digital signature of the PDS. In this regard, the PDS can be controlled by the operating system (or lower-level control, such as a hypervisor) of the notifying device in order to provide initial security for the PDS itself. Various techniques may be used to minimize power consumption attributable to the background PDS.

At some point, an application to be authenticated is launched (204) either directly by a user or otherwise, such as by clicking an icon or navigating to a webpage hosting a web application, as examples. When the application presents the login interface, the user enters his/her username or account specifier (206), if not already saved and automatically recognized by the application on startup. The application then displays, on the basis of this username/specifier, a static QR code (208), as shown in FIG. 3. The example application interface 300 of FIG. 3 presents static QR code 306. Static QR code 306 can encode any desired data items. In some embodiments, it encodes (i) an application identifier that can uniquely identify the application to the device executing the application and/or to the notifying device, the device performing authentication processing described herein, or a trusted authentication entity as described herein, as examples, (ii) an application user indicator, and/or (iii) address identifier for a trusted authentication entity, as examples. Though this information is encoded into the optical code, some or all of this information may also be in encrypted form, to be decrypted after being decoded.

The application user indicator can serve as a user identity for the user—a unique mapping between the user and the specific user identity that is registered with the trusted authentication entity associated with the legitimate application (the bank's authentication entity, in this example). For increased security, this application user indicator may purposely be concealed or otherwise difficult for a malicious party to imitate. As an example, the application user indicator may be an identifier that a user enters or selects, or is assigned, during a pre-enrollment with the bank.

In some embodiments, some/all of the data encoded in the static QR code is maintained at the trusted authentication entity, such as the bank server for the banking application of FIG. 3, and retrieved on demand or beforehand and built into the static QR code for presentation on application launch. Thus, in some examples, the user launches the application and enters his/her username at which point the application is to communicate to the bank server (in this example) to pull the static QR code (or data used by the system executing the application to construct the static QR code) and display it for the user. If at this point the application fails to display any QR code at all, the user may immediately recognize that the application is not the legitimate application.

Figure 8:
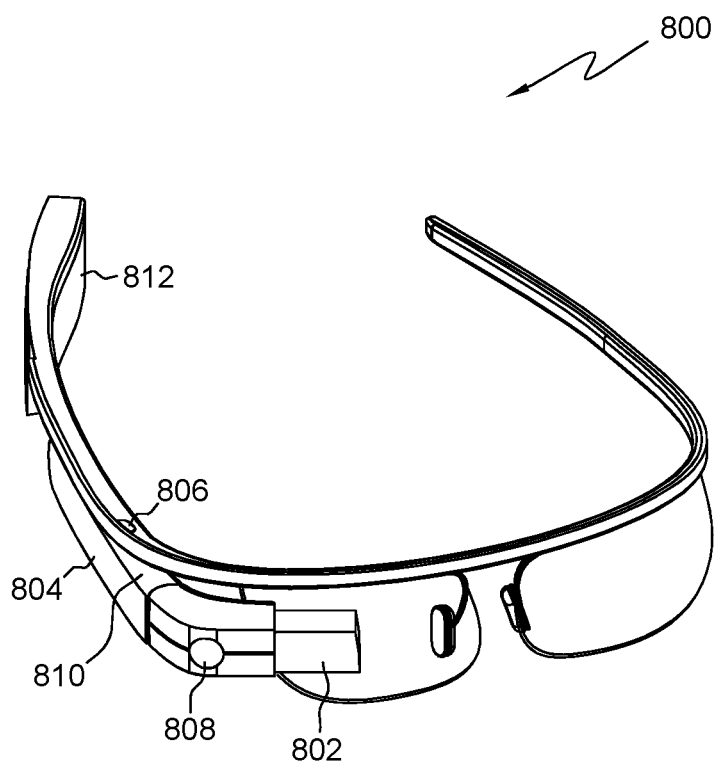
FIG. 8 depicts an example of a wearable device to perform one or more aspects described herein.

During this process, the PDS running in a wearable device of the user (or other device with imaging capability) may continuously or periodically leverage a camera, scanner, or other imaging system of the device to scan the display on which the application login interface is presented (e.g. the screen of the application device, such as the user's smartphone). In a specific example, the users wears a wearable device such as the example wearable device as shown in FIG. 8 that has a camera that images the screen of the user's smartphone. The PDS then detects the static QR code (210) and decodes/decrypts it (212).

In some examples, the PDS will start checking the authenticity of the application (described below) as soon as it detects a QR code on an application launch/login screen. The checking can happen in the background so that PDS does not disrupt the user. Additionally or alternatively, PDS software runs in the background and continuously or periodically assesses whether or not an application legitimacy check is needed for an encountered optical code, which may be an optical code presented by an application for legitimacy checking, or may be presented by an application for other reasons unrelated to legitimacy checking. The QR code itself might contain or embed a pattern, marker or other cue for the PDS to invoke the application legitimacy checking At this point the PDS, having imaged the QR code, invokes comparison processing to compare the obtained QR code and/or data decoded therefrom with legitimate data, such as data it received from a trusted authentication entity. In some embodiments, the PDS is preconfigured with the legitimate data, which may be a QR code (in this example) or may be other data such as an application user indicator, to which the QR code or data decoded therefrom is compared in order to assess whether the application is legitimate. In some embodiments, the PDS securely stores a QR code and compares the obtained QR code, imaged from the display of the application device, to the stored QR code. Additionally or alternatively, the imaged QR code may be decoded to obtain data of the QR code, and that data may be compared to the stored data to assess application legitimacy. In other embodiments, the PDS sends obtained optical code data, such as a representation of the QR code itself or data decoded from the QR code, to a trusted authentication entity, the comparison is performed by that entity, and an indication as to whether the application is the legitimate application is provided back to the PDS In some examples, the application user indicator is provided or ascertained based on an active user profile of the computer system on which the application is launched. The user profile may serve to inform the system, e.g. the PDS, of the particular user profile, which in turn is used by the PDS to determine the appropriate application user indicator to expect from the optical code, or alternatively is provided to the trusted authentication entity to determine the appropriate application user indicator to expect from the optical code in the case that this aspects of validation is performed by the trusted authentication entity.

As noted above, the QR code can encode an application identifier and/or identifier of a trusted authentication entity, such as a bank server using the example of FIG. 3, to be used in authenticating the application as being the legitimate application. As before, the encoded data may an encoded form of encrypted data. The identification may be recognized by the PDS and may itself serve as an indication of application legitimacy. The QR code may embed a uniform resource locator (URL), for instance, indicating the address of the trusted authentication entity and the PDS may check that against a whitelist of URLs, perhaps indexed by the legitimate application identifier that each whitelisted URL corresponds to. The URL may be the address of the trusted verification entity, i.e. to which data of an optical code is to be provided for verification, or from which trusted data for comparison against an optical code is received. In both scenarios, the URL serves as an indicator that authentication is being based on using the real server (trusted authentication entity) associated with the legitimate application, to help ensure that a spoofed server is not being used for authentication.

Returning to FIG. 2, after the QR code is decoded/decrypted (212), the process continues by determining whether the static QR code is invalid (214), for instance fails to convey a proper user identity or otherwise fails to convey what is expected from a static QR code presented by the legitimate application at this stage. If so, the process ends with the application not being authenticated as being the legitimate application.

Up to this point in the process of FIG. 2, there are at least two safeguards against application phishing as assisted by optically imaging the display of the application device on which the application is launched: (i) the mere presence of an optical code displayed in association with an application to be authenticated, and (ii) if such an optical code is present, a comparison of the data of the optical code to expected data, to determine whether the optical code presented is valid or invalid. Thus, a provisional indication of authenticity of the application is provided. However, this provisional indication may be subject to modification based on further processing as described herein. Even a hacked application might be able to build a username-based or other request and send it to a legitimate backend trusted authentication server, such as the bank server in the above example. Unless trusted handshaking is involved in this communication, the bank server may unknowingly provide the legitimate static optical code (or other data) to the illegitimate application, which can display a static optical code using that data and expect it to be verified as valid by the PDS.

Accordingly, if it is determined at inquiry (214) that the static optical code is not invalid, based on, for instance, a case in which there is a match between the static QR code (or data encoded thereby) and expected data (an expected QR code or expected application user indicator, for instance), this is not necessarily a definite indication that the application is legitimate. The authentication processing continues to a next phase involving dynamically generated optical code data. To initiate this phase, the PDS on the user's wearable (or other notifying) device can notify the trusted authentication entity, e.g. bank server, at which point the trusted authentication entity dynamically generates optical code data. The dynamically generated optical code data may be an optical code itself (i.e. a binary representation of the code) or may be data used by another entity such as a legitimate application to generate an optical code, as examples. The dynamically generated optical code data is provided separately to both the PDS and the legitimate application for display of a dynamic optical code. There may exist a trusted communication channel between the backend trusted authentication entity and the legitimate application through which the optical code data is provided to the legitimate application. Thus, the dynamically generated optical code data may accordingly be used to generate a dynamic optical code (dynamic QR code) (216). The dynamic QR code may be a random and unique QR code, imparting the dynamic nature to the code, in contrast to the static QR code described previously that in some embodiments follows a set standard or formula in terms of what information it carries and typically will not change each time it is presented.

In one example, the dynamically generated optical code data provided by the trusted authentication entity to the legitimate application and the PDS is a dynamic QR code itself. In other examples, the dynamically generated optical code data provided to one or both entities is data used by the legitimate application and/or PDS to generate the dynamic QR code.

In embodiments above, the trusted authentication entity, e.g. bank server, dynamically generates the optical code data and provides it to the user's notifying device (wearable or other device), and to the legitimate application installed on the user's application device. The bank server may be assumed to be a trusted, uncompromised component and the seed value(s) for the generation, as well as the generator algorithm(s) used internally, may be unknown and undiscoverable to the outside world. The bank server could modify the random QR code generator algorithm(s) and/or their seed value(s) periodically for enhanced security. By way of specific example for illustration purposes, an example QR code (input mode: Numeric Only) may have 7089 characters, in which case the generator can generate $N=10^{7089}$ unique QR codes. The probability that a hacker is able to coincidentally generate a unique QR code generated at random under this scenario is $1/(N^2)$, assuming a uniform distribution, which is practically a guaranteed prevention against a snapshot-based phishing attack against this technique.

In alternative embodiments, the notifying device itself could generate the dynamically generated optical code data, such as the dynamic QR code or the data to be used by the application to generate the QR code, for instance using a Trusted Execution Environment (TEE). The notifying device could then send the dynamically generated optical code data directly to the legitimate application on the application device through a secure channel. The PDS may become aware of the legitimate application executing on the application device by way of a pre-enrollment phase in which the two establish a secure way of communicating. After the static QR code phase passes, the wearable device may generate the dynamically generated optical code data and provide it directly to the legitimate application through a near-field or network connection between the two, e.g. for display of the dynamic QR code. As an alternative to providing the dynamically generated optical code data directly to the legitimate application, the wearable device could instead send it to the trusted authentication entity for provision to the legitimate application.

The legitimate application is configured to receive dynamically generated optical code data, generate the dynamic QR code (if not already part of the received optical code data), and display the dynamic QR code. An example of such a display is provided in FIG. 4. In this example, the legitimate application displays the dynamic QR code in the same widget where the static QR code was previously displayed (FIG. 3). The example application interface 400 of FIG. 4 presents dynamic QR code 408. The notifying device by way of the PDS and/or other software can scan/image the dynamic QR code and compare (FIG. 2, #218) it against the dynamically generated optical code data obtained either from the trusted application entity or from generating it itself. The comparison may include decoding the dynamic QR code and decrypting encrypted data thereof to obtain the data that is to be compared to the trusted dynamically generated optical code data.

From a security standpoint it may be desired for the comparison to occur at the trusted authentication entity, in which case the PDS can obtain the optical code data based on imaging the application interface and provide the data to the trusted authentication entity to perform the comparison to the trusted dynamically generated optical code data. In this case the dynamically generated optical code data need not be provided from the trusted authentication entity to the PDS or other entity. In contrast, from a user experience point of view, moving as much of the process as possible to the notifying device lessens reliance on an active network connection (e.g. to the trusted authentication entity), albeit with the tradeoff of increased energy consumption.

The process of FIG. 2 continues by determining whether the dynamic QR code is invalid (220). Invalidity refers to the dynamic QR code being incorrect in the sense that it does not convey or match what is expected from a dynamic QR code presented by the legitimate application, for instance fails to convey some or all of the trusted dynamically generated optical code data that was provided to the legitimate application and is expected to presented by the launched application now being authenticated.

If the dynamic QR code is invalid, the process ends (in one example by providing an indication of invalidity as described below). If the dynamic QR code is valid, then the application is considered to be authenticated as being the legitimate application it purports to be. This is because the dynamically generated optical code data is delivered securely only to the legitimate application in the application device, and therefore a malicious application will not have that data to correctly spoof the application. In other words, the assurance of legitimacy is premised on the fact that the dynamically generated optical code data was provided to the legitimate application, and that the application purporting to be the legitimate application presented a dynamic QR code that could, with near certainty, be built only if that application possessed the dynamically generated optical code data. The conclusion is that if the application presents a dynamic QR code that matches with the trusted dynamically generated optical code data, then the application must be the legitimate application.

The notifying device can indicate or notify the user of the result of the authentication process, which may be accomplished using any suitable indication, such as a visual, haptic, and/or audible indication. As a specific example, if the process determines that the application is authenticated as being the legitimate application, the notifying device displays a green light in its display screen to inform the user that the application has been authenticated as being the legitimate application. If the process instead determines that the application is not authenticated as being the legitimate application, the notifying device displays a red light in its display screen to inform the user that the application has not been authenticated as being the legitimate application, e.g. that it is a malicious application.

As an enhancement, indications can be given to the user beginning at any prior point in the process of FIG. 2. For instance, upon PDS detecting a launch of an application and/or that a launched application is to be authenticated as being legitimate, a constant or periodic indication (such as a red light) may be given to the user to indicate that application legitimacy checking is occurring and/or the application has not yet been authenticated as being legitimate. If the application is authenticated as being legitimate, then the indication can change (e.g. to a green light) to inform the user that it is safe to proceed using the application on the basis that it was authorized as being the legitimate application. If the application is not authenticated as being legitimate, then the indication can remain as is and/or may take another form that indicates that the legitimacy authentication process has ended and the application has affirmatively been determined not to be authenticated as the legitimate application.

After the legitimacy of the application is verified as described above, the user can provide any additional security credentials to fully log into the application. In the examples of FIGS. 3 & 4, the user can enter his/her password or pin 410. The process of FIG. 2 therefore proceeds to receive the user's password and authenticate the user (222).

The following provides some additional possible aspects of the phishing detection software, which in some embodiments executes on the notifying device such as a wearable device of the user.

Phishing detection software executing on an eye gadget wearable device (FIG. 8) having a camera and processing capability can take on the visual perspective of the user to image the optical code(s) and determine whether the displayed application is malicious or legitimate;

There are various ways to help secure the phishing detection software against tampering. Implementing data obfuscation, a trusted execution environment (TEE), secure storage, and/or end-point security are examples. Thus the phishing detection software itself may be implemented using safeguards that help avoid phishing or other attacks again the PDS;

Phishing detection software that runs on a wearable device can be started by the operating system of the wearable device absent user involvement or intervention, to help prevent phishing or other attacks;

The operating system can launch the phishing detection software during its boot and after verifying the digital signature of the PDS, to ensure the PDS has not been compromised;

Phishing detection software can start checking the authenticity of any application as soon as the PDS detects an optical code in an application presented on the display of the application device. This checking can happen in the background. The PDS can run as a background application and monitor for presence of an optical code in an imaging space proximate (such as in front of a camera of) the application device, and can trigger the checking based on detecting an optical code, or on detecting an optical code and at least partially processing it to obtain an indication that it is an optical code for application legitimacy authentication. The background execution may prevent disturbance of the user experience (as the optical code that was imaged may be embedded into other types of applications for some purposes other than for application legitimacy authentication).

Aspects described herein can effectively address application phishing and associated malicious activity. According to aspects described herein, static and/or dynamic optical code(s) may be leveraged for application authentication. Even if a malicious entity successfully snapshots a static optical code and displays it in a malicious application to cheat a user, a second phase involving dynamically generated optical code data can detect an invalid dynamic optical code that is delivered to the legitimate application but not other (e.g. malicious) applications. The probability of a malicious entity coincidentally generating and presenting the same dynamic optical code as was generated and provided to the legitimate application on-demand during application verification is extremely unlikely and virtually impossible.

In accordance with some embodiments described herein, the phishing detection software in the notifying device is configured to communicate with any corresponding legitimate application by recognizing an application identifier retrieved from, e.g., a static optical code initially presented by the launched application. Mapping(s) for the PDS between legitimate application(s) and their respective application identifier(s) may be done in a pre-enrollment phase to apprise the PDS of the correct process identifier (PID) or package name of the legitimate application installed on the application device in order to facilitate communication between the two based on the application identifier retrieved from a static optical code. Additionally or alternatively, this communication may take place between the PDS and the legitimate applications through the trusted authentication entity, which may be a remote system in communication with the notifying device across network(s) or other communication links.

Figure 5:
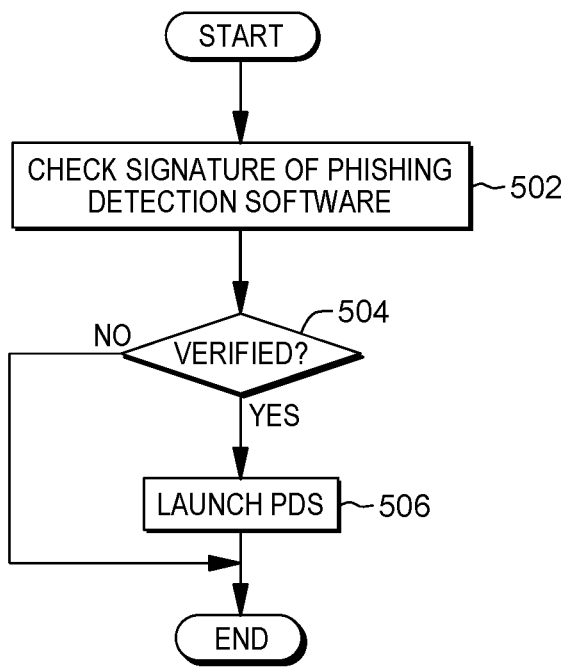
FIG. 5 depicts an example process to launch phishing detection software, in accordance with aspects described herein.
Figure 6:
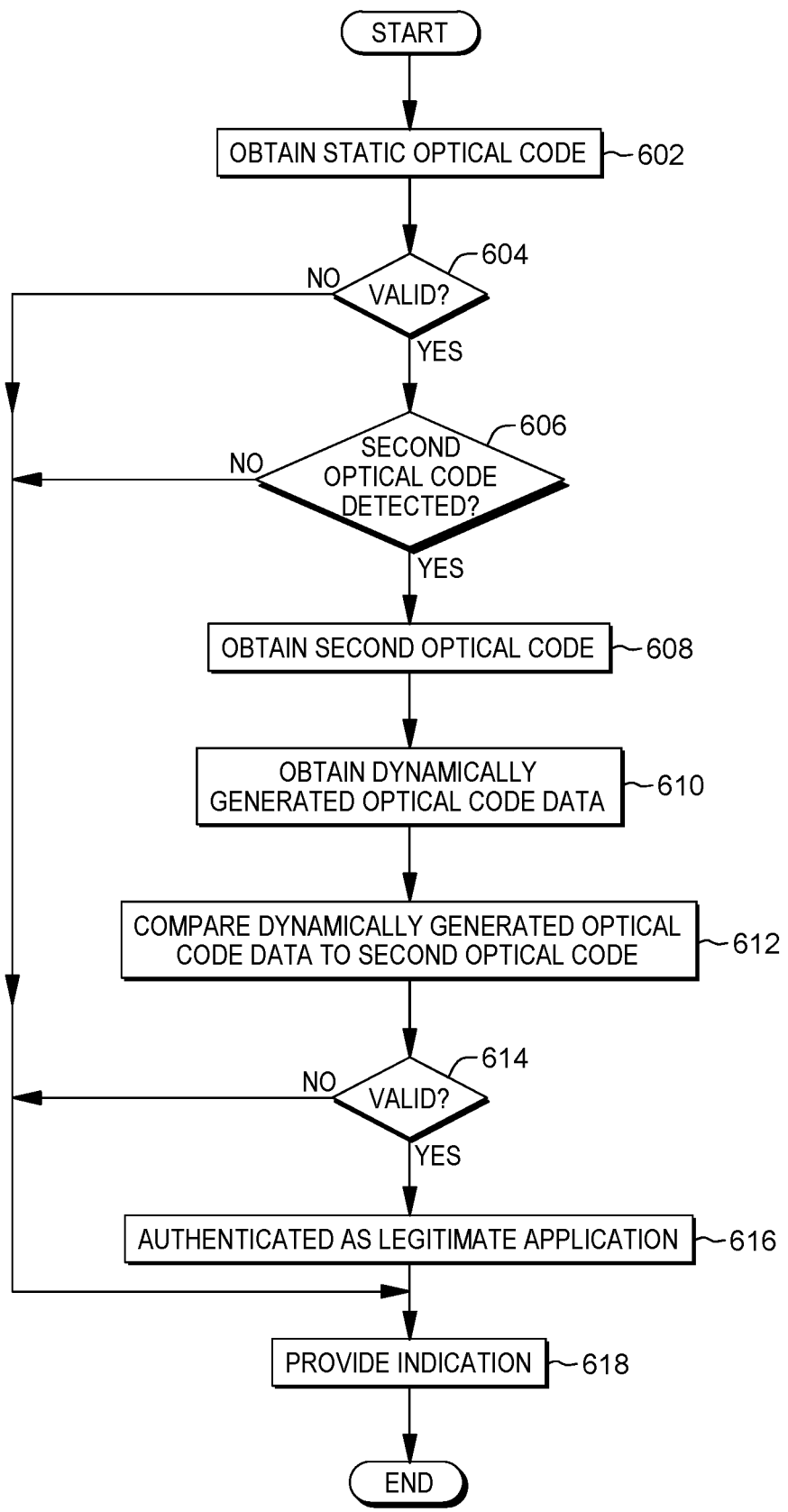
FIG. 6 depicts an example process to authenticate an application as being a legitimate application, in accordance with aspects described herein.

Accordingly, FIGS. 5 & 6 depict example processes in accordance with aspects described herein. FIG. 5 depicts an example process to launch phishing detection software, in accordance with aspects described herein. This process may be performed by a computer system, such as a user device, and more specifically a notifying device as described herein, which may be a wearable device, as an example. The process begins during boot of a user device and triggers a check of a digital signature of the phishing detection software (PDS) of the user device (502). An altered digital signature from what is expected can indicate tampering with the software. The process then determines whether the signature is verified (504). If not, the process ends, perhaps with a notification to the user that PDS could not be verified. Otherwise, if verified, the process launches the PDS (506) to initiate its execution.

At this point or some time thereafter, a process is performed for authenticating an application as being a legitimate application it purports to be. An example such process is depicted in FIG. 6. In some embodiments the process is performed based on detecting an optical code. In this regard, the PDS may be an application running as a background application of the user device and may monitor for presence of an optical code in an imaging space proximate the user device. Based on detecting an optical code, the PDS software and/or other software can perform the process of FIG. 6 in part or in whole. In accordance with aspects of FIG. 6, optical codes are imaged using a camera of a device (such as a wearable device) to obtain data of the optical code(s). The device used to image the optical codes may be different from a device on which the application is launched and displayed. In one specific example, the user has a wearable device on which the PDS is running and a separate device, such as a smartphone, on which the application for authentication is launched.

An optical code can include computer-readable encoded information (which may also be in a form recognizable by users), and the data of the optical code can include decoded data that is decoded from the encoded information of the optical code. The optical code(s) used in aspects described herein may be displayed on a display device in association with the application to be authenticated as being a legitimate application. The application may be a mobile application (one running on a mobile device), a web application, or any other type of application to be authenticated as being a legitimate application. By legitimate application is meant another, trustworthy application that the launched application (being authenticated) represents itself to be. On the basis of obtaining the optical code(s) and performing processing described herein, the processing makes a determination as to whether the launched application is authenticated as being the legitimate application, and an indication of that determining is provided.

With reference now to FIG. 6, based on launch of the application an optical code is displayed. The process obtains this static optical code (602) and proceeds to determine whether that static optical code is valid (604), i.e. what is expected to be presented by the legitimate application. This may be determined by identifying whether the static optical code conveys a user identity registered with a trusted authentication entity associated with the legitimate application as being a proper user identity for the user. In some examples the trusted authentication entity is a remote device. Additionally or alternatively, the trusted authentication entity could be the device that obtained the static optical code data, such as a wearable device of the user.

If it is determined that the obtained static optical code is not valid, then, based on this, an indication is provided to the user (618) indicating that the application is not authenticated as being the legitimate application. In a specific example where the static optical code is expected to convey the user identity registered with the trusted authentication entity of the legitimate application, then based on the static optical code failing to convey the user identity registered with the trusted authentication entity of the legitimate application, it is determined that the application to be authenticated is not authenticated as being the legitimate application and the provided indication indicates that the application to be authenticated is not authenticated as being the legitimate application.

In a scenario where the static optical code is valid, for instance it conveys the user identity registered with the trusted authentication entity, then this provides a provisional indication of authenticity of the application, which may be subject to modification after a further determination of authenticity of the application is performed. The further determination may be based on obtaining dynamically generated second optical code data, as described below.

Thus, if it was determined at (604) that the static optical code is valid, then the process continues by determining whether a second optical code is detected, for instance by imaging the display of the device on which the application is launched. The legitimate application is configured to present a dynamic optical code, which may be based on dynamically generated optical code data provided to the legitimate application. Therefore, it is determined whether a second optical code detected (606) and, if no second optical code is detected within a given timeframe, then the process proceeds to indicate that the application was not authenticated as being the legitimate application (618).

If instead a second optical code is detected, then the second optical code is obtained (608) (if not already fully obtained) by, for example, imaging the second optical code as it is displayed on the display device in association with the application to be authenticated. Meanwhile, separate from obtaining the second optical code, the device of the user obtains dynamically generated optical code data (610). This dynamically generated optical code data may also be provided to the legitimate application by way of a trusted authentication entity associated with the legitimate application in order to facilitate the authentication as described herein.

Obtaining the dynamically generated data can in some examples include receiving the dynamically generated optical code data from a trusted authentication entity, which may be a remote device. In other examples, obtaining the dynamically generated optical code data includes the device of the user (notifying device) generating this data. In any case, the trusted authentication entity provides the dynamically generated optical code data to the legitimate application. In the case where the device of the user (notifying device) generated the dynamically generated optical code data, then it can provide this dynamically generated optical code data to the trusted authentication entity for provision to the legitimate application.

The process of FIG. 6 continues by comparing data of the second optical code to the obtained dynamically generated optical code data (612). The comparison determines whether the two match, and therefore whether the second optical code is valid (614). If the comparing indicates a mismatch between the data of the second optical code and the dynamically generated optical code data, then it is determined that the second optical code is invalid. This indicates that the second optical code was not dynamically generated based on the dynamically generated optical code data provided to the legitimate application. Consequently, the launched application to be authenticated is not authenticated as being the legitimate application, based on the fact that the dynamically generated optical code data was provided to the legitimate application (which is configured to receive that and display a dynamic optical code in response) and based on the fact that the launched application failed to display, on the display device and in association with the application to be authenticated, a dynamically generated optical code dynamically generated based on the dynamically generated optical code data. An appropriate indication is provided to the user (618) and the process ends.

In instead at (614) it is determined that the second optical code is valid, then the application is authenticated as being the legitimate application (616). Thus, if the comparing (612) indicates a match between the data of the second optical code and the dynamically generated optical code data, it indicates that the second optical code is a dynamically generated optical code generated based on the dynamically generated optical code data that was provided to the legitimate application. The launched application to be authenticated is authenticated as being the legitimate application based the fact that the dynamically generated optical code data was provided to the legitimate application and based on the fact that the launched application displayed, on the display device and in association with the application to be authenticated, the dynamically generated optical code dynamically generated based on the received dynamically generated optical code data. An appropriate indication is therefore provided to the user (618) and the process ends.

The provided indication of whether the application to be authenticated is authenticated as being the legitimate application can be any appropriate indication to apprise the user of the authentication, or lack thereof, of the launched application. As examples, an indication can include visual, haptic, and/or audible indication(s) for the user. As described herein, such indication can be provided beginning at any point in the process in order to provide a continuous indicator to the user as to the status and/or outcome of the legitimacy authentication. As an example, when the process of FIG. 6 is performed, an initial indication of non-authentication (e.g. red light) is given to the user but is subject to modification based on the final outcome of the processing. The notifying device may provide a red light indication to indicate that authentication is being performed for a launched application by has not yet been authenticated as being the legitimate application, and that red light might change to green assuming the application is authenticated as being the legitimate application.

Processes described herein may be performed by one or more computer systems. In some examples, such a computer system that performs process(es) described herein is a computer system that is part of, includes, or uses a flexible display or apparatus into which the flexible display is incorporated. In other examples, a remote computer system in communication with such computer system performs process(es) described herein. As a third possibility, a combination of the (i) computer system including/using the flexible display and (ii) remote computing system(s) perform process(es) described herein.

Figure 7:
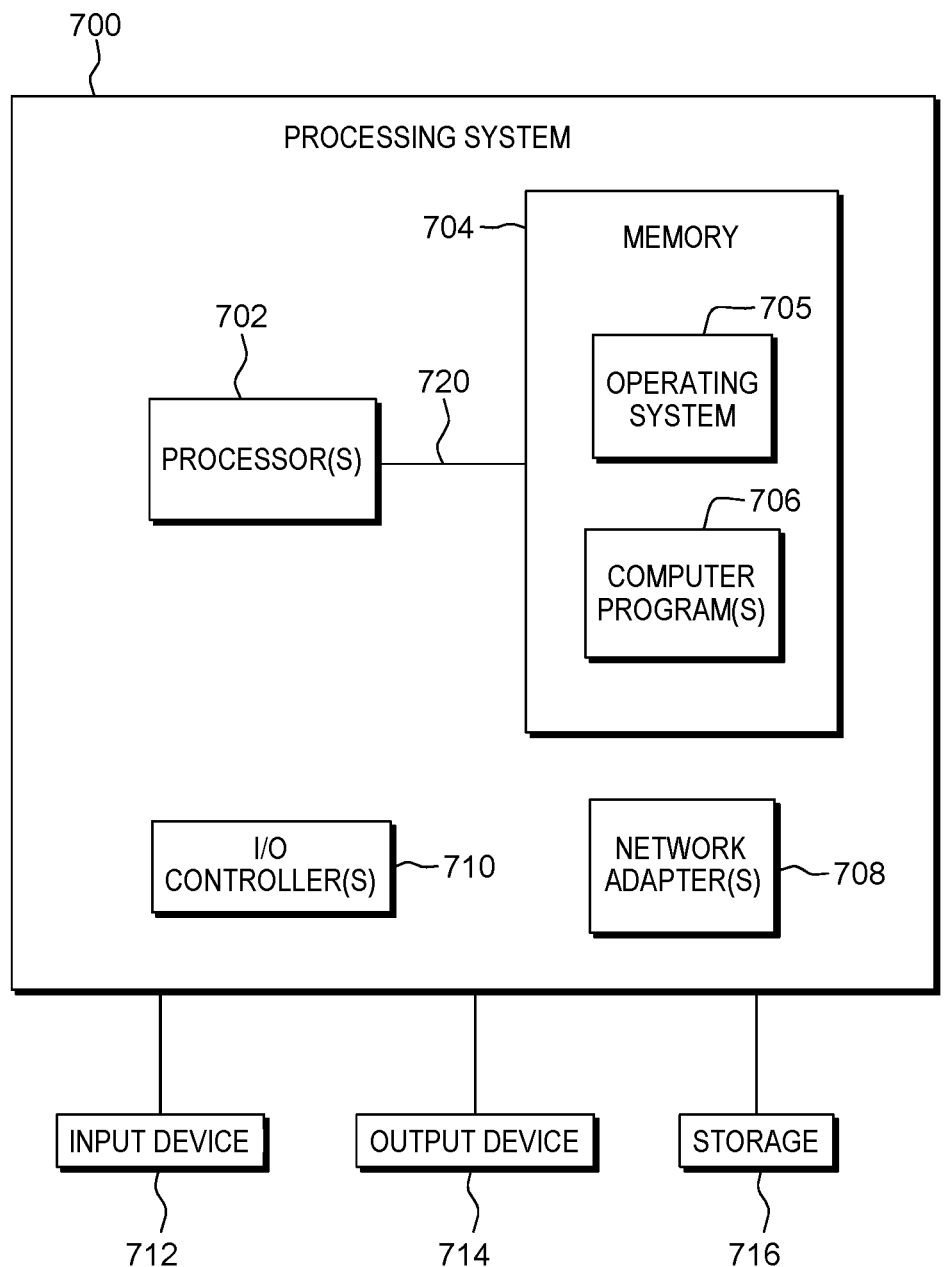
FIG. 7 depicts an example of a computer system to incorporate and use aspects described herein.

FIG. 7 depicts one example of a computer system to incorporate and use aspects described herein. A computer system may also be referred to herein as a processing device/system or computing device/system, or simply a computer. Computer system 700 may be based on various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 700 is suitable for storing and/or executing program code and includes at least one processor 702 coupled directly or indirectly to memory 704 through, e.g., a system bus 720. In operation, processor(s) 702 obtain from memory 704 one or more instructions for execution by the processors. Memory 704 may include local memory employed during actual execution of the program code, bulk storage, and cache memories which provide temporary storage of at least some program code in order to reduce the number of times code must be retrieved from bulk storage during program code execution. A non-limiting list of examples of memory 704 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 704 includes an operating system 705 and one or more computer programs 706, for instance programs to perform aspects described herein.

Input/Output (I/O) devices 712, 714 (including but not limited to displays, s, microphones, speakers, accelerometers, gyroscopes, magnetometers, light sensors, proximity sensors, GPS devices, cameras, etc.) may be coupled to the system either directly or through I/O controllers 710.

Network adapters 708 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 708 used in computer system.

Computer system 700 may be coupled to storage 716 (e.g., a non-volatile storage area, such as magnetic disk drives, optical disk drives, a tape drive, etc.), having one or more databases. Storage 716 may include an internal storage device or an attached or network accessible storage. Computer programs in storage 716 may be loaded into memory 704 and executed by a processor 702 in a manner known in the art.

The computer system 700 may include fewer components than illustrated, additional components not illustrated herein, or some combination of the components illustrated and additional components. Computer system 700 may include any computing device known in the art, such as a mainframe, server, personal computer, workstation, laptop, handheld or mobile computer, tablet, wearable device, telephony device, network appliance, virtualization device, storage controller, etc.

FIG. 8 depicts another example of a computer system to incorporate and use aspects described herein. FIG. 8 depicts an example eyewear gadget wearable device. Device 800 can include many of the same types of components included in computer system 700 described above. In the example of FIG. 8, device 800 is configured to be wearable on the head of the device user. The device includes a display 802 that is positioned in the line of sight of the user when the device is in operative position on the user's head. Suitable displays can utilize LCD, CRT, or OLED display technologies, as examples.

Device 800 also includes touch input portion 804 that enable users to input touch-gestures in order to control functions of the device. Such gestures can be interpreted as commands, for instance a command to take a picture, or a command to launch a particular service. Device 800 also includes button 806, in order to control function(s) of the device. Example functions include locking, shutting down, or placing the device into a standby or sleep mode.

Various other input devices are provided, such as camera 808, which can be used to capture images or video. The camera can also be used by the device to obtain an image of the user's view of his or her environment to use in, for instance, capturing an image of a display of another computer system being used by the user and/or a determination of the current context under which services of the device are executing or attempting to be executed. One or more microphones, proximity sensors, light sensors, accelerometers, speakers, GPS devices, and/or other input devices (not labeled) may be additionally provided, for instance within housing 810. Housing 810 can also include other electronic components, such as electronic circuitry, including processor(s), memory, and/or communications devices, such as cellular, short-range wireless (e.g. Bluetooth), or WiFi circuitry for connection to remote devices. Housing 810 can further include a power source, such as a battery to power components of device 800. Additionally or alternatively, any such circuitry or battery can be included in enlarged end 812, which may be enlarged to accommodate such components. Enlarged end 812, or any other portion of device 800, can also include physical port(s) (not pictured) used to connect device 800 to a power source (to recharge a battery) and/or any other external device, such as a computer. Such physical ports can be of any standardized or proprietary type, such as Universal Serial Bus (USB).

Figure 9:
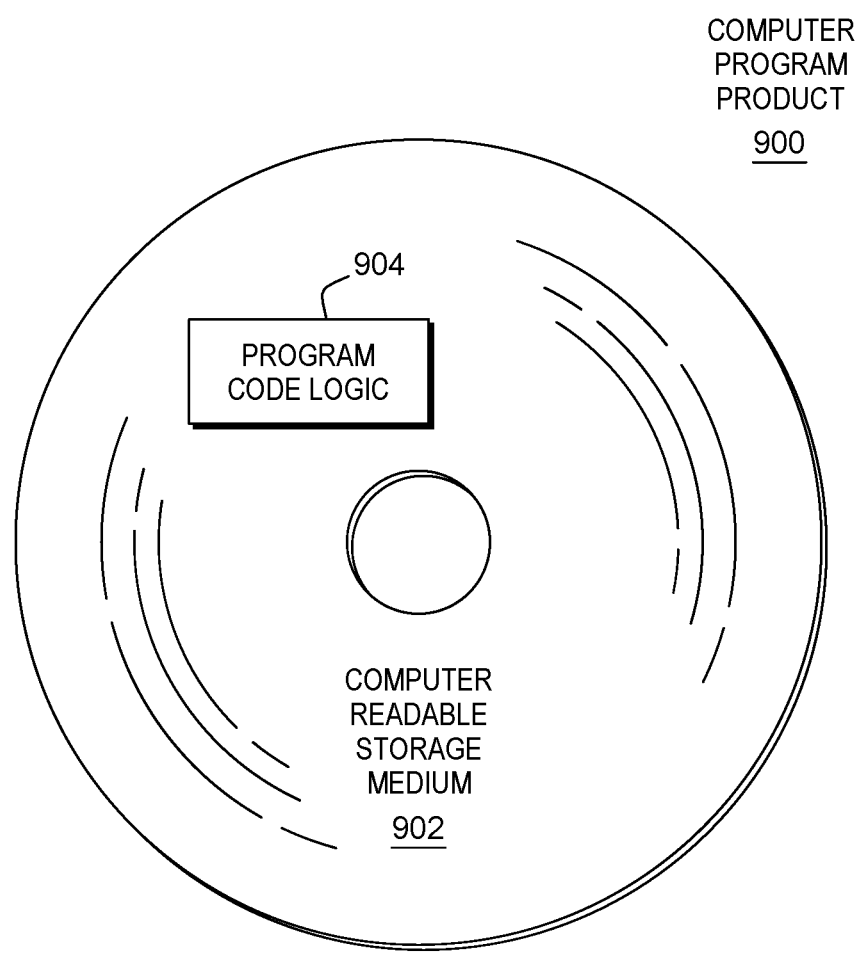
FIG. 9 depicts one embodiment of a computer program product.

Referring to FIG. 9, in one example, a computer program product 900 includes, for instance, one or more computer readable storage media 902 to store computer readable program code means, logic and/or instructions 904 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
obtaining, by a user device of a user based on imaging at least one optical code using a camera of the user device of the user, data of the at least one optical code, the at least one optical code being displayed on a display device in association with an application to be authenticated for the user as being a legitimate application;
automatically determining by the user device, based on the obtained data of the at least one optical code and on obtaining and comparing (i) data from a trusted authentication entity associated with the legitimate application, the data from the trusted authentication entity being provided to the user device separate from the at least one optical code, to (ii) the obtained data of the at least one optical code, whether the application to be authenticated is authenticated as being the legitimate application; and
providing for the user, by the user device, based on the automatically determining, an indication of whether the application to be authenticated is authenticated as being the legitimate application.

2. The method of claim 1, wherein the application to be authenticated comprises a mobile application or a web application.

3. The method of claim 1, wherein the user device comprises a wearable device, and wherein the indication comprises at least one visual, haptic, or audible indication for the user.

4. The method of claim 1, wherein the at least optical code comprises computer readable encoded information and the data of the at least one optical code comprises decoded data decoded from the encoded information.

5. The method of claim 1, further comprising triggering, during boot of the user device, checking a digital signature of an application of the user device.

6. The method of claim 5, further comprising, based on verifying the digital signature as being correct, initiating execution of the application, wherein the application at least partially performs the obtaining, the automatically determining, and the providing.

7. The method of claim 1, wherein an application running as a background application of the user device monitors for presence of an optical code in an imaging space proximate the user device.

8. The method of claim 7, wherein the obtaining, the automatically determining, and the providing are performed based on detecting presence of the optical code, the optical code being an optical code of the at least one optical code.

9. A computer program product comprising:
a non-transitory computer readable storage medium readable by a processing circuit and storing instructions for execution by the processing circuit for performing a method comprising:
obtaining, by a user device of a user based on imaging at least one optical code using a camera of the user device, data of the at least one optical code, the at least one optical code being displayed on a display device in association with an application to be authenticated for the user as being a legitimate application;
automatically determining by the user device, based on the obtained data of the at least one optical code and on obtaining and comparing (i) data from a trusted authentication entity association with the legitimate application, the data from the trusted authentication entity being provided to the device separate from the at least one optical code, to (ii) the obtained data of the at least one optical code, whether the application to be authenticated is authenticated as being the legitimate application; and
providing for the user, by the user device, based on the automatically determining, an indication of whether the application to be authenticated is authenticated as being the legitimate application.

10. The computer program product of claim 9, wherein the application to be authenticated comprises a mobile application or a web application.

11. The computer program product of claim 9, wherein the method further comprises triggering, during boot of the user device, checking a digital signature of an application of the user device.

12. The computer program product of claim 11, wherein the method further comprises, based on verifying the digital signature as being correct, initiating execution of the application, wherein the application at least partially performs the obtaining, the automatically determining, and the providing.

13. The computer program product of claim 9, wherein an application running as a background application of the user device monitors for presence of an optical code in an imaging space proximate the user device.

14. The computer program product of claim 13, wherein the obtaining, the automatically determining, and the providing are performed based on detecting presence of the optical code, the optical code being an optical code of the at least one optical code.

15. A computer system comprising:
a memory; and
a processor in communication with the memory, wherein the computer system is configured to perform a method, the method comprising:
obtaining, by a user device of a user based on imaging at least one optical code using a camera of the user device of the user, data of the at least one optical code, the at least one optical code being displayed on a display device in association with an application to be authenticated for the user as being a legitimate application;
automatically determining by the user device, based on the obtained data of the at least one optical code and on obtaining and comparing (i) data from a trusted authentication entity associated with the legitimate application, the data from the trusted authentication entity being provided to the user device separate from the at least one optical code, to (ii) the obtained data of the at least one optical code, whether the application to be authenticated is authenticated as being the legitimate application; and
providing for the user, by the user device, based on the automatically determining, an indication of whether the application to be authenticated is authenticated as being the legitimate application.

16. The computer system of claim 15, wherein the application to be authenticated comprises a mobile application or a web application.

17. The computer system of claim 15, wherein the method further comprises triggering, during boot of the user device, checking a digital signature of an application of the user device.

18. The computer system of claim 17, wherein the method further comprises, based on verifying the digital signature as being correct, initiating execution of the application, wherein the application at least partially performs the obtaining, the automatically determining, and the providing.

19. The computer system of claim 15, wherein an application running as a background application of the user device monitors for presence of an optical code in an imaging space proximate the user device.

20. The computer system of claim 19, wherein the obtaining, the automatically determining, and the providing are performed based on detecting presence of the optical code, the optical code being an optical code of the at least one optical code.

* * * * *